United States Patent
Takeyama et al.

(10) Patent No.: US 9,905,879 B2
(45) Date of Patent: Feb. 27, 2018

(54) FUEL CELL DEVICE

(71) Applicant: TOYOTA JIDOSHA KABUSHIKI KAISHA, Toyota-shi, Aichi (JP)

(72) Inventors: Makoto Takeyama, Toyota (JP); Tateki Takayama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 152 days.

(21) Appl. No.: 14/928,060

(22) Filed: Oct. 30, 2015

(65) Prior Publication Data

US 2016/0141701 A1    May 19, 2016

(30) Foreign Application Priority Data

Nov. 13, 2014 (JP) ................... 2014-230526

(51) Int. Cl.
*H01M 8/24* (2016.01)
*H01M 8/248* (2016.01)

(52) U.S. Cl.
CPC .................. *H01M 8/248* (2013.01)

(58) Field of Classification Search
CPC ................. H01M 8/2475; H01M 8/248
See application file for complete search history.

(56) References Cited

U.S. PATENT DOCUMENTS

| | | |
|---|---|---|
| 2008/0007065 A1 | 1/2008 | Kim |
| 2009/0176145 A1 | 7/2009 | Inagaki |
| 2014/0169911 A1* | 6/2014 | Sugimoto ............ F16B 33/004 411/366.1 |
| 2015/0162474 A1* | 6/2015 | Uchida ................. H01L 31/055 136/247 |

FOREIGN PATENT DOCUMENTS

| | | |
|---|---|---|
| CN | 202317580 U | 7/2012 |
| JP | 2007-018832 A | 1/2007 |
| JP | 2008-4305 | 1/2008 |
| JP | 2008-41367 | 2/2008 |
| JP | 2014-183015 A | 9/2014 |
| KR | 10-0542147 B1 | 1/2006 |
| KR | 10-0670435 B1 | 1/2007 |

* cited by examiner

*Primary Examiner* — Muhammad S Siddiquee
(74) *Attorney, Agent, or Firm* — Finnegan, Henderson, Farabow, Garrett & Dunner, LLP (57) ABSTRACT

A fuel cell device includes a fuel cell body, a case and a pin having one end contacting a part of the fuel cell body. A through hole is formed in the case. The through hole penetrates the case from the outside to the inside. The pin is inserted in the through hole and provided with a sealing member formed on at least a part of an outer circumferential surface. The through hole has a constant inner diameter from a position inside the case to a border with the outside. In the through hole, an inner diameter between a portion of the constant inner diameter and the border with the outside is larger than the constant inner diameter. The pin has an opposite end located inside the through hole in a portion from an end of the portion of the constant inner diameter to the border with the outside.

3 Claims, 5 Drawing Sheets

FUEL CELL DEVICE

CROSS-REFERENCE TO RELATED APPLICATIONS

The present application claims the priority based on the Japanese Patent Application No. 2014-230526 filed on Nov. 13, 2014, the entirety of disclosure of which is hereby incorporated by reference into this application.

BACKGROUND

1. Field

This invention relates to a fuel cell device.

2. Related Art

In a fuel cell having a cell stack composed of multiple stacked unit cells, the cell stack is fastened under a predetermined load to a stacking structure, for maintaining the stacking structure. Referring to a fuel cell described in JP2008-041367A, for example, a spring module is arranged on the side of one end surface of a cell stack so as to be in contact with the cell stack. A predetermined load is applied to the spring module in a direction toward the cell stack, thereby maintaining the stacking structure of the cell stack. In this fuel cell, a female screw is formed in an end plate arranged outside the spring module in a stacking direction. A screw is inserted in this female screw from outside to make the tip of the inserted screw contact the spring module, thereby applying the predetermined load to the spring module continuously. The fuel cell is generally housed in a case. Thus, inserting a screw in a female screw formed in the case instead of the female screw in the end plate also enables adjustment of the load on the cell stack.

If the fuel cell is used in a mobile body such as a vehicle, placing the head of the screw threadedly engaged with the case in a position protruding to the outside from the case is not preferable as collision of the mobile body causes the risk of damaging a member existing near the fuel cell. Thus, it is preferable that a set screw without a screw head be used and this screw be inserted in a manner such that the rear end of the screw in an insertion direction is housed in a position on an inner side relative to a surface of the case. The case is required to be water resistant for the reason of suppressing entry of water into the fuel cell. Thus, in a structure where a female screw is formed in the case and a set screw is to be threadedly engaged in the female screw, using a set screw with an outer circumferential surface coated with a sealing member is an assumed method of assuring sealing performance between the case and the set screw. According to this method, however, the sealing member is removed with the screw thread of the female screw near its insertion hole while the set screw is inserted. In a condition after insertion is completed, the rear end of the set screw is located in a position deeper than the insertion hole. This makes it impossible for the sealing member having been removed with the screw thread near the insertion hole to provide sealing performance. This reduces the sealing performance between the case and the screw, causing the risk of reducing the water resistance of the case. Thus, a technique of suppressing reduction in the water resistance of the case by suppressing reduction in the sealing performance between the case and the screw has been desired. These problems are applied not only to a screw to be used for fixing a pressure plate but is common to various fuel cell devices including screws to be inserted in cases for any different purposes. These problems are also applied to a pin as an insertion member without a screw thread on the outer circumferential surface thereof to be inserted in a case.

SUMMARY

This invention has been made to solve at least some of the aforementioned problems. This invention can be implemented in the following aspects.

(1) According to one aspect of the invention, a fuel cell device is provided. The fuel cell device may comprise a fuel cell body having a plurality of stacked unit cells, a case housing the fuel cell body inside the case and a pin having one end contacting a part of the fuel cell body to fix the fuel cell body. A through hole may be formed in the case, the through hole may penetrates the case from the outside to the inside of the case. The pin may be inserted in the through hole and provided with a sealing member formed on at least a part of an outer circumferential surface of the pin. The through hole may have a constant inner diameter for a predetermined distance between a position inside the case and a border with the outside of the case. In the through hole, an inner diameter between a portion of the constant inner diameter and the border with the outside of the case may be larger than the constant inner diameter. In the through hole, at least a part of the sealing member may be located at an edge of the portion of the constant inner diameter in an outbound direction of the case. The pin has the other end located inside the through hole in a portion between an end of the portion of the constant inner diameter in the outbound direction of the case and the border with the outside of the case. In the fuel cell device of this aspect, the inner diameter between the portion of the constant inner diameter and the border with the outside of the case is larger than the constant inner diameter. It can be suppressed that the sealing member will be removed in a place near an insertion hole of the through hole while the pin is inserted in the through hole. Further, at least a part of the sealing member is located at the edge of the portion of the constant inner diameter in the outbound direction of the case. This can suppress reduction in sealing performance between the case and the pin, thereby suppressing reduction in the water resistance of the case. Additionally, the other end of the pin is located inside the through hole in the portion between the end of the portion of the constant inner diameter in the outbound direction of the case and the border with the outside of the case. This prevents the pin from protruding to the outside from the case. It can be suppressed that the pin will hit a member existing near the fuel cell device during collision when the fuel cell device is used in a mobile body such as a vehicle, thereby suppressing damage on this member.

(2) In the fuel cell device of the above aspect, a screw thread may be formed on each of the outer circumferential surface of the pin and an inner circumferential surface of the portion of the constant inner diameter, and the pin and the portion of the constant inner diameter may be threadedly engaged with each other. In the fuel cell device of this aspect, the screw thread is formed on each of the outer circumferential surface of the pin and the inner circumferential surface of the portion of the constant inner diameter. This facilitates insertion of the pin in the through hole while facilitating adjustment of a degree of screwing of the pin in an insertion direction.

(3) in the fuel cell device of the aforementioned aspect, the pin may be configured as a set screw without a head. In the fuel cell device of this aspect, the absence of a head of the pin makes it possible to locate the other end of the pin inside the through hole in the portion between the end of the portion of the constant inner diameter in the outbound direction of the case and the border with the outside of the case without the need of increasing the inner diameter between the portion of the constant inner diameter and the border with the outside of the case. Thus, compared to a structure where the inner diameter of the through hole is excessively large between the portion of the constant inner diameter and the border with the outside of the case, entry of water from the outside of the case is suppressed, thereby making it, unlikely that water will be stored in the through hole between the portion of the constant inner diameter and the border with the outside of the case.

(4) In the fuel cell device of the aforementioned aspect, the through hole may be formed in a lateral surface portion of the case facing a surface of the fuel cell body at one end in a stacking direction, and the one end of the pin may contact the surface of the fuel cell body at the one end. In the fuel cell device of this aspect, the pin inserted from the outside of the case contacts the surface of the fuel cell body at one end in the stacking direction, thereby maintaining a compressive load on a stack. Thus, compared to a structure where the pin is inserted in the through hole formed in an end plate and the fuel cell body maintained under the compressive load is housed inside the case, the end plate can be omitted to suppress size increase of the fuel cell device.

This invention can be implemented in various aspects. For example, this invention can be implemented in aspects including a fuel cell case, a fuel cell system including a fuel cell device, a vehicle on which the fuel cell system is installed, and a method of manufacturing the fuel cell case.

DESCRIPTION OF EMBODIMENTS

A. Embodiment

A-1. Device Structure

Figure 1:
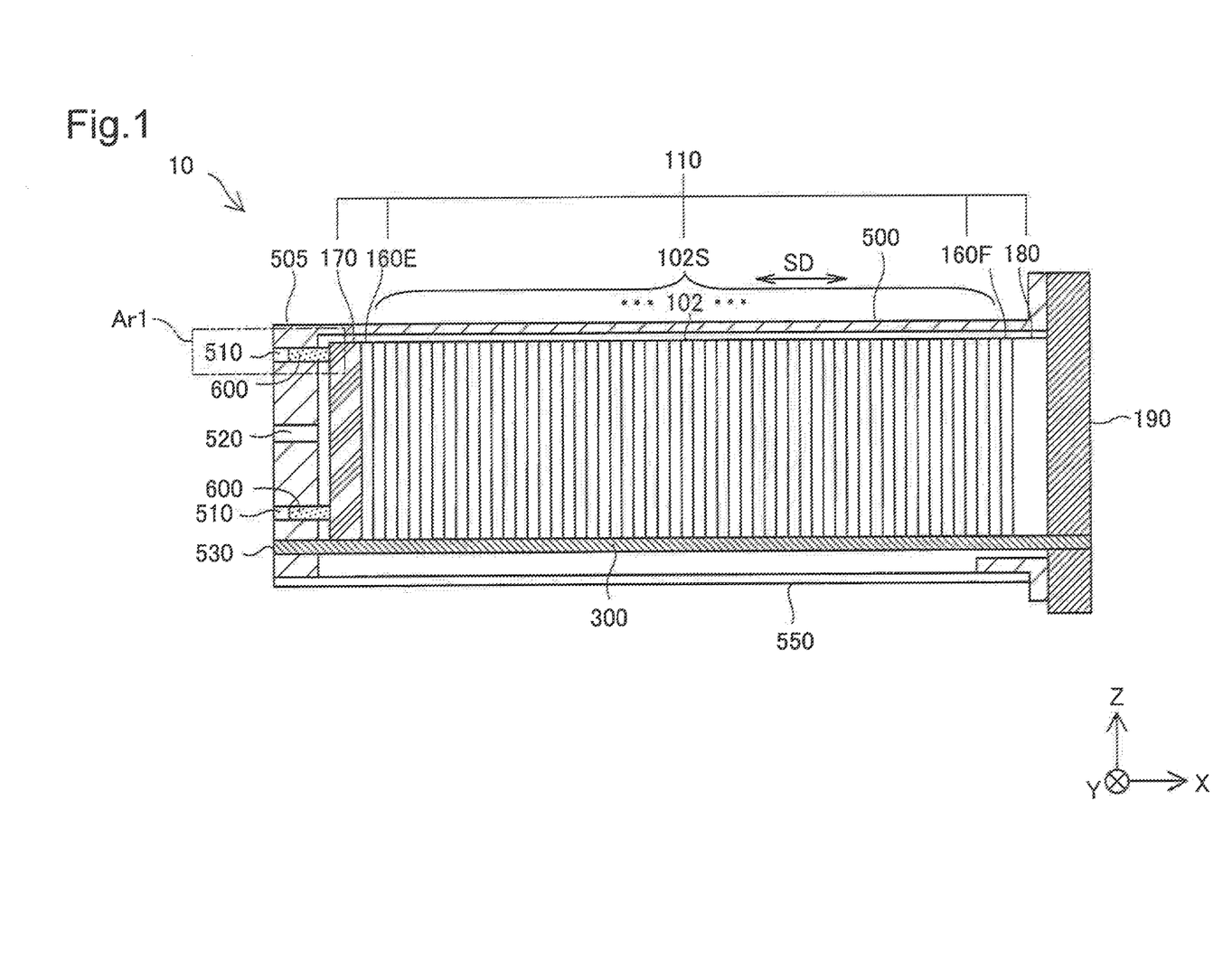
FIG. 1 is a sectional view showing the outline of the structure of a fuel cell device as an embodiment of this invention.

FIG. 1 is a sectional view showing the outline of the structure of a fuel cell device as an embodiment of this invention. A fuel cell device 10 includes what is called a solid polymer fuel cell. The fuel cell device 10 forms a fuel cell system together with a supply portion for fuel gas and oxidizing gas as reactive gas, a supply portion for a cooling medium, etc. This fuel cell system is installed on and used in a fuel cell vehicle as a system of supplying driving power.

The fuel cell device 10 includes a fuel cell body 110, an end plate 190, a tension shaft 300, a case 500, and a cover 550. The fuel cell body 110 includes a cell stack 102S, a first current collecting plate 160E, a second current collecting plate 160F, a pressure plate 170, and a stack manifold 180.

The cell stack 102S has a structure where multiple unit cells 102 are stacked in a stacking direction SD. The unit cells 102 are each formed of a membrane electrode assembly, a pair of gas diffusion layers holding the membrane electrode assembly between the gas diffusion layers, and a pair of separators holding a stack of the membrane electrode assembly and the pair of gas diffusion layers between the separators. In this embodiment, an X axis and a Y axis are defined so as to make an X-Y plane extend parallel to a horizontal plane. The Y axis and a Z axis are each perpendicular to the X axis. A +Z direction corresponds to an upward vertical direction. A −Z direction corresponds to a downward vertical direction. As shown in FIG. 1, the fuel cell device 10 is placed in a manner such that the stacking direction SD extends parallel to the X axis.

The first current collecting plate 160E is arranged so as to contact an end surface of the cell stack 102S in a −X direction. In this embodiment, the first current collecting plate 160E is made of aluminum. The second current collecting plate 160F is arranged so as to contact an end surface of the cell stack 102S in a +X direction. In this embodiment, the second current collecting plate 160F has a three-layer structure including a titanium layer, an aluminum layer, and a titanium layer. The second current collecting plate 160F has an outer edge covered with rubber. The first and second current collecting plates 160E and 160F collect power generated by each unit cell 102 and output the collected power to the outside through a terminal not shown in the drawings. Like the second current collecting plate 160F, the first current collecting plate 160E may have a three-layer structure. The two current collecting plates 160E and 166E may be made of any conductive material other than aluminum and titanium.

The pressure plate 170 is arranged on an outer side in the stacking direction SD (−X direction) relative to the first current collecting plate 160E. An insulator not shown in the drawings is arranged between the pressure plate 170 and the first current collecting plate 160E. The pressure plate 170 is fixed with screws 600 and presses the cell stack 102S.

All of a surface of each unit cell 102, that of each of the first and second current collecting plates 160E and 160F, and that of the pressure plate 170 perpendicular to the stacking direction SD are substantially shaped into rectangles. Each unit cell 102, the first and second current collecting plates 160E and 160F, and the pressure plate 170 are arranged so as to make their longitudinal directions extend parallel to the Y axis.

The stack manifold 180 is arranged so as to contact a surface of the second current collecting plate 160F in the +X direction. The stack manifold 180 includes a flow path for supply of the reactive gas and the cooling medium and a flow path for discharge of the reactive gas and the cooling medium formed inside the stack manifold 180. The stack manifold 180 connects the supply portion for the reactive gas and the supply portion of the cooling medium to the cell stack 102S and supplies the reactive gas and the cooling medium to the cell stack 102S. A circulation piping, a gas-liquid separator, etc, as components forming a fuel gas supply system are attached to the stack manifold 180.

The end plate 190 is arranged so as to contact a surface of the stack manifold 180 in the +X direction. The end plate 190 is made of aluminum and closes an opening formed in a lateral surface of the case 500 in the +X direction. The end plate 190 is connected to the case 500 through the tension shaft 300.

An edge of the tension shaft 300 in the direction is connected to the end plate 190 with a nut not shown in the drawings. An edge of the tension shaft 300 in the −X direction is connected to the case 500. In this way, the tension shaft 300 fastens the cell stack 102S, the end plate 190, and the case 500, thereby maintaining a stacking structure of the cell stack 102S. In this embodiment, the tension shaft 300 is formed of three bar members having their longitudinal directions agreeing with the stacking direction SD. The tension shaft 300 is arranged vertically below the cell stack 102S and extends parallel to the stacking direction SD. The three bar members forming the tension shaft 300 are spaced from each other by predetermined distances in a direction along the Y axis. The number of the bar members forming the tension shaft 300 may be any number not limited to three. All the three bar members forming the tension shaft 300 have circular cross-sectional shapes in a direction perpendicular to the stacking direction SD. These cross-sectional shapes of the members may be any shape other than a circular shape. All the three bar members forming the tension shaft 300 are made of iron. These members may be made of any metal such as steel other than iron.

The outer shape of the case 500 is a substantially rectangular parallelepiped. The case 500 houses the fuel cell body 110 including the cell stack 102S inside the case 500. An opening is formed in each of the lateral surface of the case 500 in the +X direction and a lateral surface of the case 500 in the −Z direction. The opening in the lateral surface in the +X direction is closed by the end plate 190. The opening in the lateral surface in the −Z direction is closed by the cover 550. A lateral surface of the case 500 in the −X direction (hereinafter also called a lateral surface portion 505) faces a surface of the pressure plate 170 in the −X direction.

Figure 2:
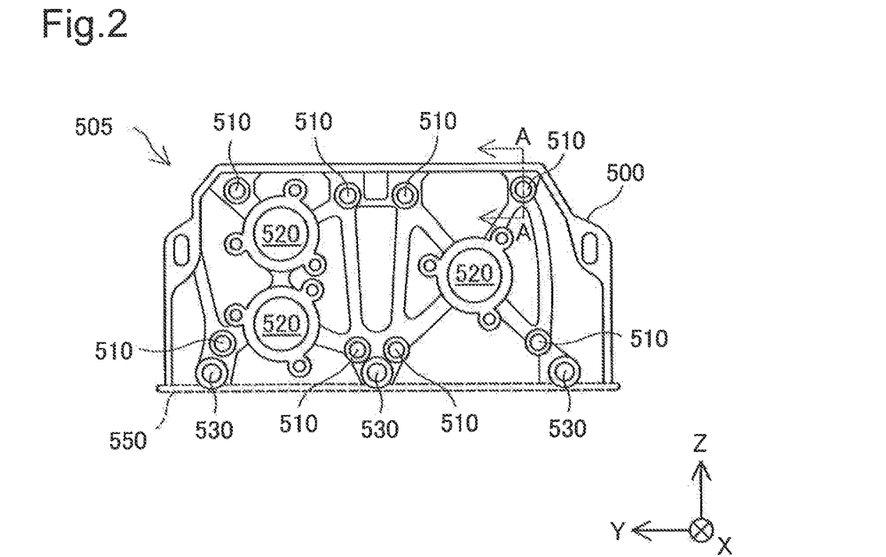
FIG. 2 is a plan view showing the outer structure of a lateral surface portion.

FIG. 2 is a plan view showing the outer structure of the lateral surface portion 505. In FIG. 2, the cover 550 is indicated by dashed lines. The lateral surface portion 505 is provided with eight through holes 510 for letting the screws 600 pass through, three pressure member inlets 520, and three tension shaft inlets 530. The lateral surface portion 505 is further provided with multiple ribs protruding in the −X direction that are formed with the intention of reducing the weight and maintaining the strength of the case 500.

The eight through holes 510 are formed near an edge of the lateral surface portion 505 in the +Z direction or an edge of the lateral surface portion 505 in the −Z direction. Four of the eight through holes 510 are arranged near the edge of the lateral surface portion 505 in the +Z direction and spaced from each other by predetermined distances in the direction along the Y axis. The other four of the eight through holes 510 are arranged near the edge of the lateral surface portion 505 in the −Z direction and spaced from each other by predetermined distances in the direction along the Y axis. Each through hole 510 may be formed in any different manner. As shown in FIG. 1, the screws 600 is inserted in each through hole 510, thereby fixing the pressure plate 170.

In this embodiment, all the through holes 510 have the same internal structure. The structure of the through holes 510 is described in detail later.

The three pressure member inlets 520 are formed in the substantially central area of the lateral surface portion 505. During assembly of the fuel cell device 10, pressure members are inserted in the pressure member inlets 520 from the outside of the case 500. The pressure members press the pressure plate 170 in the +X direction, thereby compressing the cell stack 102S in the stacking direction SD. Next, the pressure plate 170 is fixed with the screws 600. Then, the pressure members are pulled out and each pressure member inlet 520 is closed by a pressure member cover not shown in the drawings.

The three tension shaft inlets 530 are arranged near the edge of the lateral surface portion 505 in the −Z direction and spaced from each other by predetermined distances in the direction along the Y axis. The three bar members forming the tension shaft 300 are inserted in the corresponding tension shaft inlets 530.

The other lateral surfaces of the case 500 (including a lateral surface in the +Y direction, a lateral surface in the direction, and a lateral surface in the +Z direction) all have plate-like outer shapes. In this embodiment, the case 500 is formed by aluminum die casting. The case 500 may be formed of any metal such as steel other than aluminum.

As shown in FIG. 1, the cover 550 is arranged vertically below the cell stack 102S and closes an opening in the bottom surface of the case 500. The cover 550 is a plate-like member having a substantially rectangular shape in a plan view. The cover 550 has a size substantially the same as that of the bottom surface of the case 500. The cover 550 is fixed to the case 500 with a bolt not shown in the drawings. In this embodiment, the cover 550 is made of iron. The cover 550 may be made of any metal such as steel other than iron.

A-2. Detailed Structure of Through Hole and that of Screw

Figure 3:
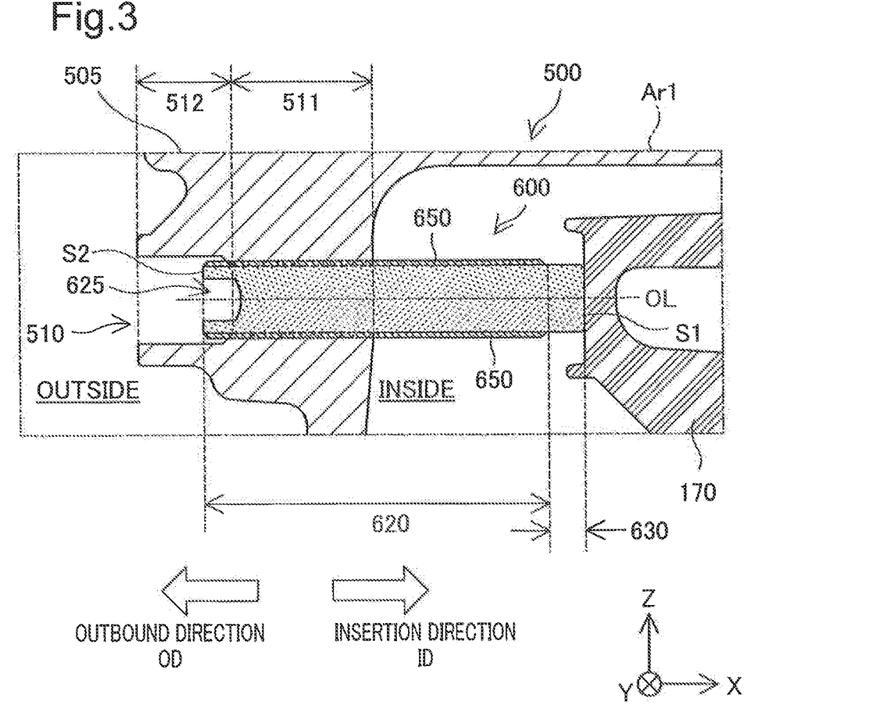
FIG. 3 is a sectional view explaining the structure of a through hole and that of a screw in an enlarged manner.

FIG. 3 is a sectional view showing the structure of the through hole 510 and that of the screw 600 in an enlarged manner. FIG. 3 shows a region Ar1 in an enlarged manner indicated by a line with alternate long and short dashes in FIG. 1. The sectional view of FIG. 3 corresponds to a A-A cross section of FIG. 2. In FIG. 3, an axis OL of the screw 600 is indicated by a line with alternate long and two short dashes. Further, an insertion direction ID for the screw 600 and an outbound direction OD of the case 500 are indicated by hollow arrows. In this embodiment, the insertion direction ID is parallel to the +X direction (the thickness direction of the lateral surface portion 505) and the outbound direction OD is parallel to the −X direction. A surface of the lateral surface portion 505 in the +X direction faces the inside of the case 500. A surface of the lateral surface portion 505 in the −X direction faces the outside of the case 500. In this embodiment, the lateral surface portion 505 is thick in an area surrounding the through hole 510. Alternatively, the thickness of the lateral surface portion 505 may be substantially the same in this surrounding area.

The through hole 510 is formed to extend in the thickness direction of the lateral surface portion 505 so as to penetrate the case 500 from the outside to the inside of the case 500. The through hole 510 has a small-diameter portion 511 and a large-diameter portion 512 aligned in the thickness direction of the lateral surface portion 505 (X-axis direction). The small-diameter portion 511 communicates with the inside of the case 500 and the large-diameter portion 512. The large-diameter portion 512 communicates with the small-diameter portion 511 and the outside of the case 500. The small-diameter portion 511 is slightly smaller in inner diameter than the large-diameter portion 512. The small-diameter portion 511 is provided with a screw thread not shown in the drawings formed across the inner circumferential surface thereof. Thus, the small-diameter portion 511 functions as a female screw. The screw thread of the small-diameter portion 511 (hereinafter also called a "female screw") is threadedly engaged with a screw thread not shown in the drawings formed on the outer circumferential surface of the screw 600 while the screw 600 is inserted in the through hole 510. A screw thread is not formed on the inner circumferential surface of the large-diameter portion 512.

In this embodiment, the inner diameter of the small-diameter portion 511 is constant. In this embodiment, the length of the small-diameter portion 511 in the X-axis direction is 20 mm and that of the large-diameter portion 512 in the X-axis direction is 15 mm. The respective lengths of the small-diameter portion 511 and the large-diameter portion 512 in the X-axis direction may be determined to be arbitrary lengths that are not limited to 20 mm and 15 mm. The respective lengths of the small-diameter portion 511 and the large-diameter portion 512 may be the same. Alternatively, the small-diameter portion 511 may be shorter than the large-diameter portion 512. Meanwhile, it is preferable that the small-diameter portion 511 have a sufficient length with which sealing performance described later can be assured. Further, it is preferable that the large-diameter portion 512 have a sufficient length with which a dimension error of the cell stack 102S in the stacking direction SD described later can be controlled.

Each screw 600 is inserted in a corresponding through hole 510 from the outside of the case 500 and screwed in in the insertion direction ID with a predetermined tool to contact the pressure plate 170, thereby fixing the pressure plate 170. In this way, the fuel cell body 110 is fixed with each screw 600. By adjusting a degree of screwing of each screw 600 in the insertion direction ID, a dimension error of the cell stack 102S in the stacking direction SD is controlled that is to occur when the cell stack 102S is fastened under a predetermined load.

In this embodiment, the screw 600 is a set screw having a substantially circular outer shape without a head. The set screw is generally called a hollow set screw. In this embodiment, the screw 600 has a nominal diameter M12. The screw 600 may have any nominal diameter other than M12. In this embodiment, the length of the screw 600 in a direction along the axis OL is determined to be a length that enables control of a dimension error of the cell stack. 102S in the stacking direction SD while preventing the screw 600 from protruding to the outside from the case 500. In this embodiment, each screw 600 is made of iron. Each screw 600 may be made of any metal such as steel other than iron.

The screw 600 includes a threadedly-engaged portion 620 and a tip portion 630. The threadedly-engaged portion 620 forms most part of the screw 600 and located along the axis OL on the side of the −X direction. In this embodiment, the outer diameter of the threadedly-engaged portion 620 is constant. The threadedly-engaged portion 620 has a screw thread not shown in the drawings formed across the outer circumferential surface thereof. The threadedly-engaged portion 620 functions as a male screw.

A sealing member 650 is applied across the outer circumferential surface of the threadedly-engaged portion 620. Specifically, the sealing member 650 is applied to the screw thread of the screw 600. In this embodiment, the sealing member 650 is formed of a pre-coating type reactive sealing agent. The pre-coating type reactive sealing agent contains materials for an adhesive sealed in a microcapsule. These materials are mixed and cured under pressure generated by threaded engagement. Thus, the pre-coating type reactive sealing agent is used appropriately as the sealing member 650. The sealing member 650 may be formed of any type of a sealing agent such as a pre-coating type non-reactive sealing agent other than the pre-coating type reactive sealing agent. The sealing member 650 may be applied to a part of the threadedly-engaged portion 620 extending in the direction along the axis OL. Meanwhile, to assure sealing performance, it is preferable that the sealing member 650 be applied to at least a part of the threadedly-engaged portion 620 that is to make threaded engagement with the female screw in a condition after insertion of the screw 600 is completed.

A tool-fitted portion 625 is formed at an edge of the threadedly-engaged portion 620 in the −X direction. The tool-fitted portion 625 is a hexagonal recess having a hexagonal cross-sectional shape with respect to the axis OL as a center. The tool-fitted portion 625 is to make a fit with a hexagonal wrench. The tool-fitted portion 625 may have any structure other than a hexagonal recess that can make a fit with a tool such as a rectangular recess, a cross recess, or a slot.

The tip portion 630 is located at one end of the screw 600 in the direction along the axis OL. In the condition after insertion of the screw 600 is completed, an end surface of the tip portion 630 in the +X direction (hereinafter called a "tip surface S1") contacts the pressure plate 170. The tip portion 630 is smaller in outer diameter than the threadedly-engaged portion 620. A screw thread is not formed on the outer circumferential surface of the tip portion 630. This makes it possible to reduce a number of times the screw 600 is tightened while the screw 600 is inserted. The tip portion 630 may be the same in outer diameter as the threadedly-engaged portion 620. A screw thread may be formed on the outer circumferential surface of the tip portion 630.

In the condition after insertion of the screw 600 is completed, an end surface of the screw 600 in the −X direction (hereinafter called a "rear end surface S2") is located on an inner side (on the side of the +X direction) relative to a part of an external surface (in the −X direction) of the lateral surface portion 505 surrounding the through hole 510. Further, the rear end surface S2 is located in a position proceeding further in the outbound direction OD (−X direction) than an end of the small-diameter portion 511 in the outbound direction OD. Specifically, the rear end surface S2 is located inside the large-diameter portion 512. In other words, the rear end surface S2 of the screw 600 is located in the through hole 510 in a portion between the end of the small-diameter portion 511 in the outbound direction OD and a border with the outside of the case 500.

In this embodiment, the screw 600 corresponds to a pin in the claims, the tip surface S1 to one end in the claims, and the rear end surface S2 to the other end in the claims. The small-diameter portion 511 corresponds to a portion of a constant inner diameter in the claims. The large-diameter portion 512 corresponds to a portion from an end of the portion of the constant inner diameter in the outbound direction of the case to a border with the outside of the case in the claims. The lateral surface portion 505 corresponds to a lateral surface portion in the claims and the surface of the pressure plate 170 in the −X direction corresponds to a surface of the fuel cell body at one end in a stacking direction in the claims.

A-3. Shape of Through Hole and Sealing Performance

Figure 4A:
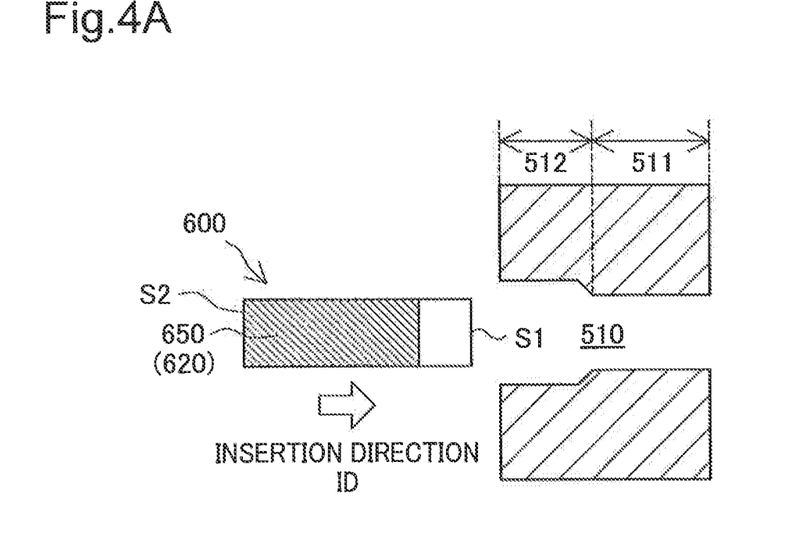
FIG. 4A is an explanatory view showing the position of the screw and that of the through hole relative to each other in a condition before the screw is inserted.
Figure 4B:
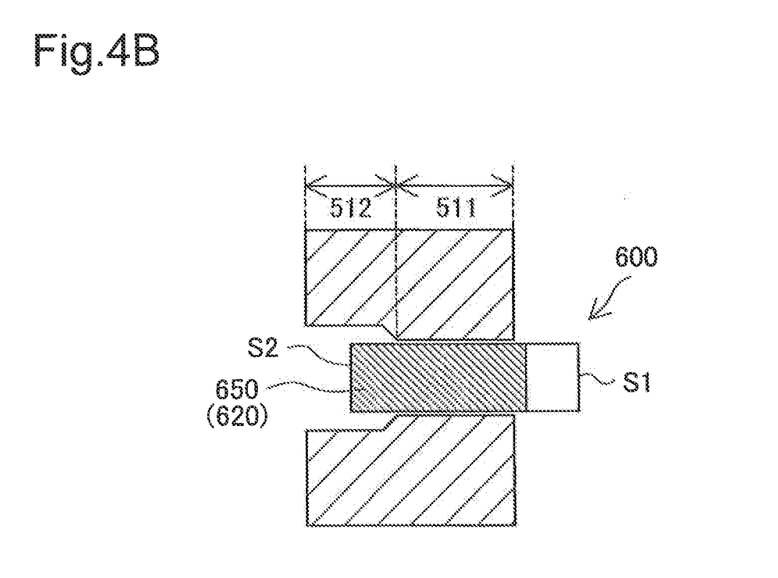
FIG. 4B is an explanatory view showing the position of the screw and that of the through hole relative to each other in a condition after insertion of the screw is completed.

FIG. 4A is an explanatory view showing the position of the screw 600 and that of the through hole 510 relative to each other in a condition before the screw 600 is inserted. FIG. 4B is an explanatory view showing the position of the screw 600 and that of the through hole 510 relative to each other in a condition after insertion of the screw 600 is completed. FIGS. 4A and 4B schematically show the shape of the through hole 510 and that of the screw 600. In FIGS. 4A and 4B, a portion of the screw 600 coated with the sealing member 650, specifically a portion corresponding to the threadedly-engaged portion 620 is hatched.

The screw 600 is inserted in the through hole 510 in the insertion direction ID indicated by a hollow arrow of FIG. 4A. A tip of the threaded-engaged portion 620 in the insertion direction ID (tip surface S1) reaches the small-diameter portion 511 without contacting the large-diameter portion 512. The screw thread formed on the outer circumferential surface of the threadedly-engaged portion 620 is threadedly engaged with the screw thread formed on the inner circumferential surface, of the small-diameter portion 511. Then, the screw 600 is screwed in until the tip surface S1 contacts the pressure plate 170 not shown in FIGS. 4A and 4B. As shown in FIG. 4B, in the condition after insertion of the screw 600 is completed, the rear end surface S2 corresponding to the rear end of the screw 600 in the insertion direction ID is located inside the large-diameter portion 512. In this way, while the screw 600 is inserted, contact of the outer circumferential surface of the screw 600 with the inner circumferential surface of the large-diameter portion 512 is avoided. This can make it suppredded that the sealing member 650 will be removed from the outer circumferential surface of the screw 600 by the large-diameter portion 512 while the screw 600 is inserted. Additionally, the rear end surface S2 does not reach the inside of the small-diameter portion 511. Thus, even if the sealing member 650 is removed by the screw thread provided to the small-diameter portion 511, the sealing member 650 still remains between the small-diameter portion 511, and the outer circumferential surface of the screw 600. This allows the sealing member 650 having been removed to provide sealing performance between the case 500 and the screw 600. Thus, reduction in sealing performance between the small-diameter portion 511 and the screw 600 is suppressed, thereby suppressing reduction in the water resistance of the case 500. For example, entry of water from the outside of the case 500 into the case 500 is suppressed in a rainy weather.

The screw 600 of this embodiment has the screw thread. This facilitates insertion of the screw 600 in the through hole 510 while facilitating adjustment of a degree of screwing of the screw 600 in the insertion direction ID. Further, the screw 600 of this embodiment is a set, screw without a screw head. This makes it possible to locate the rear end surface S2 of the screw 600 inside the large-diameter portion 512 without the need of increasing the inner diameter of the large-diameter portion 512 excessively. Thus, compared to a structure where the inner diameter of the large-diameter portion 512 is excessively large, entry of water from the outside of the case 500 into the large-diameter portion 512 is suppressed, thereby making it unlikely that water will be stored in the large-diameter portion 512. The absence of a screw head contributes to weight reduction and size reduction of the fuel cell device 10.

In this embodiment, the through hole 510 is formed in the lateral surface portion 505 of the case 500. This allows fixation of the pressure plate 170 with the screw 600 inserted from the outside of the case 500, thereby maintaining a compressive load on the cell stack 102S. Thus, compared to a structure where the screw 600 is inserted in the through hole 510 formed in an end plate and the cell stack 102S, maintained under the compressive load, is housed inside the case 500, the end plate can be omitted to suppress size increase of the fuel cell device 10.

B. Comparative Examples

B-1. Comparative Example 1

Figure 5A:
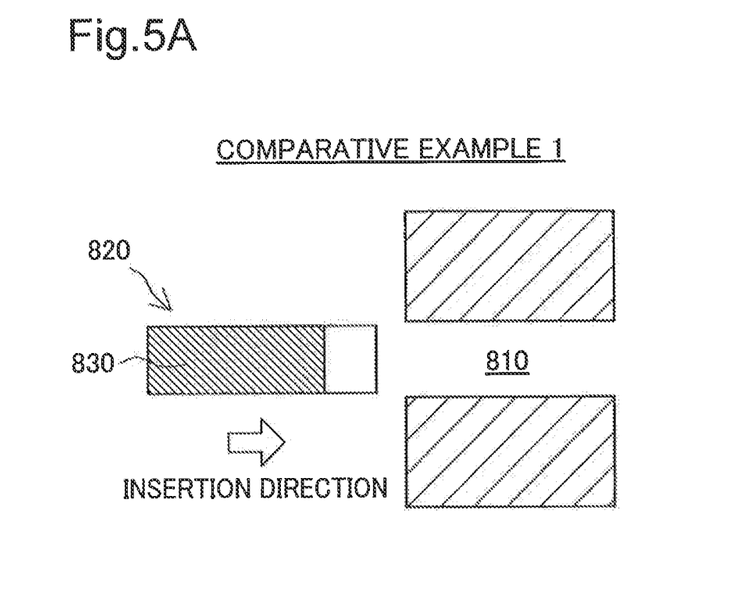
FIG. 5A is an explanatory view schematically showing a through hole and a screw in a fuel cell device of Comparative Example 1 in a condition before the screw is inserted.
Figure 5B:
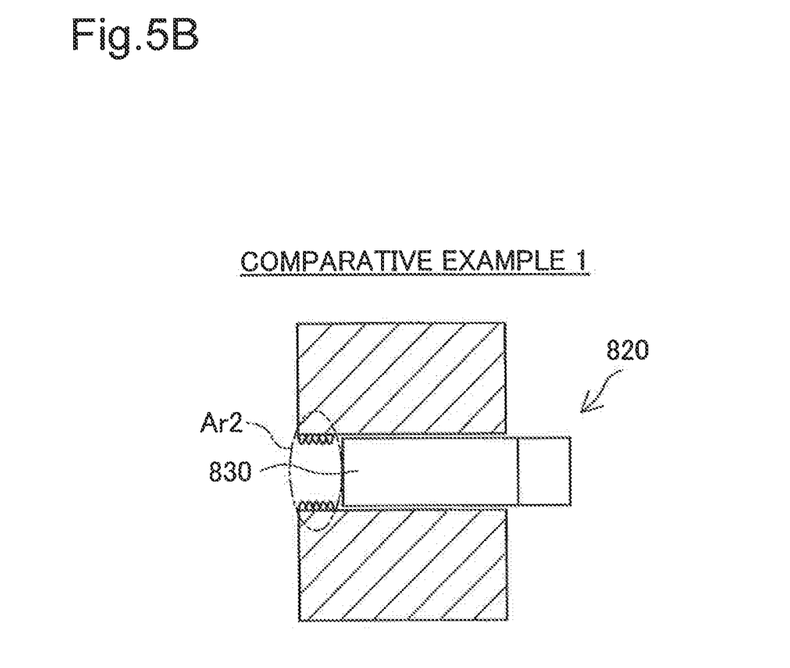
FIG. 5B is an explanatory view schematically showing the through hole and the screw in the fuel cell device of Comparative Example 1 in a condition after insertion of the screw is completed.

FIG. 5A is an explanatory view schematically showing a through hole 810 and a screw 820 in a fuel cell device of Comparative Example 1 in a condition before the screw 820 is inserted. FIG. 5B is an explanatory view schematically showing the through hole 810 and the screw 820 in the fuel cell device of Comparative Example 1 in a condition after insertion of the screw 820 is completed. The through hole 810 of Comparative Example 1 has the same inner diameter in any portion in an insertion direction and is provided with a screw thread not shown in the drawings formed across the inner circumferential surface thereof. The screw 820 of Comparative Example 1 is a set screw coated with a sealing member 830 in a region indicated by diagonal lines in the condition before the screw 820 is inserted. The screw 820 is inserted in the through hole 810 in the insertion direction indicated by a hollow arrow. In the condition after insertion is completed, the rear end of the screw 820 in the insertion direction is located inside the through hole 810. During the insertion, the sealing member 830 applied to the screw 820 is removed in a region Art indicated by a line with alternate long and short dashes in FIG. 5B with the screw thread existing near an insertion hole of the through hole 810. In the condition after the insertion is completed, the rear end of the screw 820 is in a position deeper than the insertion hole. This makes it impossible for the sealing member 830 having been removed with the screw thread near the insertion hole of the through hole 810 to provide sealing performance. This reduces sealing performance between a case and the screw 820, thereby reducing water resistance of the case.

In contrast, in the fuel cell device 10 of the aforementioned embodiment, the through hole 510 has the large-diameter portion 512 communicating with the outside of the case 500. This can make it suppressed that the sealing member 650 will be removed with the screw thread existing near an insertion hole of the through hole 510. Additionally, the rear end surface S2 does not reach the inside of the small-diameter portion 511. Thus, the sealing member 650 exists in a place where the small-diameter portion 511 and the screw 600 are threadedly engaged with each other. This can suppress reduction in sealing performance between the small-diameter portion 511 and the screw 600, thereby suppressing reduction in the water resistance of the case 500.

B-2. Comparative Example 2

Figure 6A:
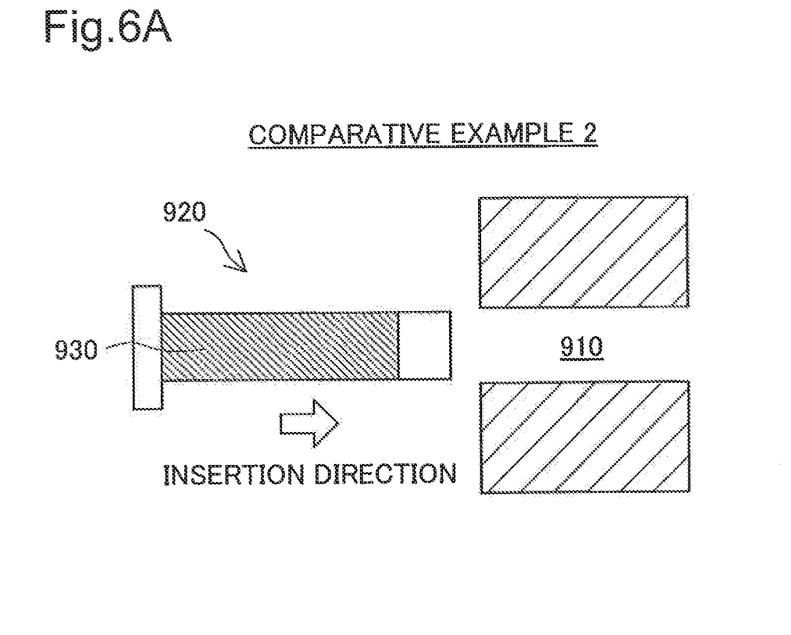
FIG. 6A is an explanatory view schematically showing a through hole and a screw in a fuel cell device of Comparative Example 2 in a condition before the screw is inserted.
Figure 6B:
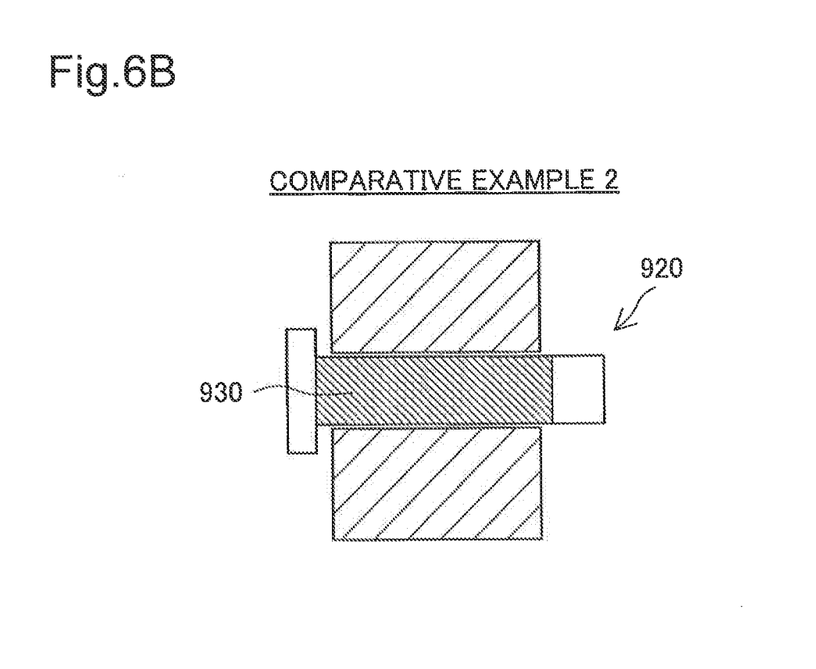
FIG. 6B is an explanatory view schematically showing the through hole and the screw in the fuel cell device of Comparative Example 2 in a condition after insertion of the screw is completed.

FIG. 6A is an explanatory view schematically showing a through hole 910 and a screw 920 in a fuel cell device of Comparative Example 2 in a condition before the screw 920 is inserted. FIG. 6B is an explanatory view schematically showing the through hole 910 and the screw 920 in the fuel cell device of Comparative Example 2 in a condition after insertion of the screw 920 is completed. Like the through hole 810 of Comparative Example 1, the through hole 910 of Comparative Example 2 has the same inner diameter in any portion in an insertion direction and is provided with a screw thread not shown in the drawings formed across the inner circumferential surface thereof. The screw 920 of Comparative Example 2 has a screw head and is coated with a sealing member 930 in a region indicated by diagonal lines. The screw 920 is inserted in the through hole 910 in the insertion direction indicated by a hollow arrow. As a result of the presence of the screw head of the screw 920, however, the rear end of the screw 920 in the insertion direction cannot be housed inside the through hole 910 to make the screw head protrude to the outside from a case, as shown in FIG. 6B. This makes the screw 920 hit a member existing near the fuel cell device during collision to damage this member.

In contrast, in the fuel cell device 10 of the aforementioned embodiment, the screw 600 does not have a screw head so the rear end of the screw 600 in the insertion direction (rear end surface S2) is located inside the large-diameter portion 512. This can make it suppressed that the screw 600 will hit a member existing near the fuel cell device 10 during collision, thereby suppressing damage on this member.

C. Modifications

C-1. First Modification

In the aforementioned embodiment, a member to be inserted in the through hole 510 is the screw 600 with a screw thread. However, this is not intended to limit this invention. A pin without a screw thread may be inserted in the through hole 510 instead of the screw 600. Even in this structure, the pressure plate 170 can still be fixed by frictional force acting between the outer circumferential surface of the pin and the inner circumferential surface of the through hole 510 (small-diameter portion 511). Further, by forming the sealing member 650 on the outer circumferential surface of the pin, sealing performance can be assured between the pin and the case 500. Additionally, locating the rear end of this pin in the insertion direction inside the large-diameter portion 512 can make it suppressed that the pin will hit a member existing near the fuel cell device 10 during collision, thereby suppressing damage on this member.

C-2. Second Modification

In the aforementioned embodiment, the screw 600 is a set screw without a screw head. However, this is not intended to limit this invention. The presence of a screw head at the screw 600 is allowed in a structure where the inner diameter of the large-diameter portion 512 is larger than the outer diameter of the screw head. Even this structure still allows the rear end of the screw 600 in the insertion direction to be located inside the large-diameter portion 512 in the condition after insertion of the screw 600 is completed.

C-3. Third Modification

In the aforementioned embodiment, the rear end surface S2 of the screw 600 is located inside the large-diameter portion 512. However, this is not intended to limit this invention. The rear end surface 82 of the screw 600 may alternatively be located at a boundary between the outside of the case 500 and the large-diameter portion 512. Still alternatively, the rear end surface 82 of the screw 600 may be located at a boundary between the small-diameter portion 511 and the large-diameter portion 512. Even these structures still achieve effect comparable to that of the embodiment. Specifically, the rear end surface 82 of the screw 600 may generally be located in the through hole 510 in the portion from the end of the portion of the constant inner diameter in the outbound direction OD of the case 500 to the border with the outside of the case 500.

C-4. Fourth Modification

In the aforementioned embodiment, the inner diameter of the small-diameter portion 511 is constant. However, this is not intended to limit this invention. The inner diameter of the small-diameter portion 511 may be constant at least partially. For example, the inner diameter of the small-diameter portion 511 may be larger in some part than that of the small-diameter portion 511 in the other part. The inner diameter of the small-diameter portion 511 may be larger at an edge thereof in the direction than that of the small-diameter portion 511 in the other part, for example. Even these structures still achieve effect comparable to that of the embodiment. Meanwhile, it is preferable that the small-diameter portion 511 have a constant inner diameter on the assumption that the small-diameter portion 511 has a sufficient length in the insertion direction with which sealing performance can be assured. Specifically, the small-diameter portion 511 may generally have a constant inner diameter for a predetermined distance from a position inside the case 500 to the border with the outside of the case 500.

C-5. Fifth Modification

In the aforementioned embodiment, all the through holes 510 have the same internal structure. Alternatively, all the through holes 510 may have internal structures different from each other. For example, the length of the small-diameter portion 511 or that of the large-diameter portion 512 may differ between the through holes 510. Alternatively, the inner diameter of the small-diameter portion 511 or that of the large-diameter portion 512 may differ between the through holes 510.

In the aforementioned embodiment, all the screws 600 have the same form. Alternatively, all the screws 600 may have forms different from each other. For example, a length in the direction of the axis OL may differ between the screws 600. As another example, a region coated with the sealing member 650 may differ between the screws 600. Specifically, the screw 600 to be used may generally have any form having the sealing member 650 formed on at least a part of the outer circumferential surface of the screw 600. In the aforementioned embodiment, the eight through holes 510 are formed in the lateral surface portion 505 of the case 500 and the case 500 has the eight screws 600. Alternatively, the number of the through holes 510 and that of the screws 600 may be any number not limited to eight.

C-6. Sixth Modification

In the aforementioned embodiment, the tip surface S1 of the screw 600 contacts the pressure plate 170. The tip surface S1 may contact any member such as an end plate other than the pressure plate 170. In the aforementioned embodiment, the through hole 510 is formed in the lateral surface portion 505 of the case 500. The through hole 510 may be formed in a different position of the case 500. In this structure, the screw 600 may be used for fixing a different member inside the case 500. Specifically, the screw 600 to be provided may generally have one end contacting a part of the fuel cell body 110 to fix the fuel cell body 110.

C-7. Seventh Modification

In the aforementioned embodiment, the fuel cell device 10 is installed on and used in a fuel cell vehicle. The fuel cell device 10 may be installed on any mobile body other than a fuel cell vehicle. Alternatively, the fuel cell device 10 may be used as a stationary fuel cell. Even this structure still achieves effect comparable to that of the embodiment and can make it suppressed that the screw 600 will hit a member existing near the fuel cell device 10 if the stationary fuel cell falls down, for example, thereby suppressing damage on this member.

This invention is not limited to the aforementioned embodiment or modifications but can be implemented in various structures within a range that does not deviate from the substance of this invention. As an example, technical features in the embodiment or those in the modifications corresponding to those in each of the aspects described in Summary of Invention can be replaced or combined, where appropriate, with the intention of solving some or all of the aforementioned problems or achieving some or all of the aforementioned effects. Unless being described as absolute necessities in this specification, these technical features may be deleted, where appropriate.

What is claimed is:

1. A fuel cell device comprising:
   a fuel cell body having a plurality of stacked unit cells;
   a case housing the fuel cell body inside the case; and
   a pin having one end contacting a part of the fuel cell body to fix the fuel cell body, wherein
   a through hole is formed in the case, the through hole penetrating the case from the outside to the inside of the case,
   the pin is inserted in the through hole and provided with a sealing member formed on at least a part of an outer circumferential surface of the pin,
   the through hole has a constant inner diameter for a predetermined distance from a position inside the case to a border with the outside of the case,
   in the through hole, an inner diameter between a portion of the constant inner diameter and the border with the outside of the case is larger than the constant inner diameter,
   in the through hole, at least a part of the sealing member is located at an edge of the portion of the constant inner diameter in an outbound direction of the case,
   the pin has the other end located inside the through hole in a portion between an end of the portion of the constant inner diameter in the outbound direction of the case and the border with the outside of the case, and
   the pin is configured as a set screw without a head.

2. The fuel cell device according to claim 1, wherein
   a screw thread is formed on each of the outer circumferential surface of the pin and an inner circumferential surface of the portion of the constant inner diameter, and
   the pin and the portion of the constant inner diameter are threadedly engaged with each other.

3. The fuel cell device according to claim 1, wherein
   the through hole is formed in a lateral surface portion of the case facing a surface of the fuel cell body at one end in a stacking direction, and
   the one end of the pin contacts the surface of the fuel cell body at the one end.

* * * * *